US010857931B1

(12) United States Patent
Malcolm (10) Patent No.: US 10,857,931 B1
(45) Date of Patent: Dec. 8, 2020

(54) BARREL TIE-DOWN BRACKET (71) Applicant: Roger J. Malcolm, San Clemente, CA (US)

(72) Inventor: Roger J. Malcolm, San Clemente, CA (US)

( * ) Notice: Subject to any disclaimer, the term of this patent is extended or adjusted under 35 U.S.C. 154(b) by 0 days.

(21) Appl. No.: 16/104,640

(22) Filed: Aug. 17, 2018

Related U.S. Application Data (63) Continuation-in-part of application No. 29/589,385, filed on Dec. 30, 2016.

(51) Int. Cl.
*B60P 7/08* (2006.01)
*B60P 7/12* (2006.01)
*B60P 3/035* (2006.01)
*B63B 25/24* (2006.01)
*B61D 45/00* (2006.01)
*B63B 25/00* (2006.01)
*B63B 25/28* (2006.01)

(52) U.S. Cl.
CPC .............. *B60P 7/12* (2013.01); *B60P 3/035* (2013.01); *B60P 7/0823* (2013.01); *B61D 45/003* (2013.01); *B61D 45/007* (2013.01); *B63B 25/004* (2013.01); *B63B 25/24* (2013.01); *B63B 25/28* (2013.01)

(58) Field of Classification Search
CPC .......... B60P 7/12; B60P 3/035; B60P 7/0823; B63B 25/28; B63B 25/004; B63B 25/24; B61D 45/003; B61D 45/007; B65D 21/0201

USPC ............ 410/31–36, 39–42, 47–49, 120, 155; 296/4; 108/57.13; 24/288; 211/85.22
See application file for complete search history.

(56) References Cited

U.S. PATENT DOCUMENTS

| 2,476,753 | A | * | 7/1949 | Miller | ..................... B60P 7/083 |
| | | | | | 410/42 |
| 3,414,311 | A | | 12/1968 | Trimboli | |
| 3,415,564 | A | | 12/1968 | Childers | |
| 4,103,812 | A | | 8/1978 | Steiner | |
| 4,487,537 | A | | 12/1984 | Morse | |
| 5,123,547 | A | * | 6/1992 | Koch | ..................... F16L 3/2235 |
| | | | | | 211/59.4 |
| 5,303,968 | A | | 4/1994 | Trine | |
| 5,501,497 | A | | 3/1996 | Holloway | |
| 6,341,931 | B1 | | 1/2002 | Bates | |

\* cited by examiner

*Primary Examiner* — Stephen T Gordon
(74) *Attorney, Agent, or Firm* — Charmasson, Buchaca & Leach, LLP (57) ABSTRACT

A bracket for securing a container or an array of co-planarly adjacent containers, such as cylindrical barrels or oil drums to a transport vehicle. Each bracket can include a generally ring-shaped circular, planar body having a diameter sized to substantially match the outer diameter of the circular end of the barrel. Six couplings extend radially outwardly from the peripheral sidewall of the bracket body at angularly evenly spaced apart locations. The axial positions of the couplings can be reciprocatingly staggered so that couplings extending from adjacent brackets can overlap and interconnect to one another, thereby conjoining the brackets across the array. Hooked cables can secure the vehicle to the couplings.

10 Claims, 15 Drawing Sheets

BARREL TIE-DOWN BRACKET

PRIOR APPLICATION

This application is a continuation-in-part of U.S. patent application Ser. No. 29/589,385, filed 2016 Dec. 30, incorporated herein by reference.

FIELD OF THE INVENTION

This invention relates to cargo mounting structures and more particularly to secure mounting of uniform containers such as oil drums.

BACKGROUND

Transport of liquid commodities such as lubricating oil, and chemicals involves the use of standardized containers such as cylindrical barrels or drums. These containers must often be carried on the flat bed of vehicles such as trucks, trailers, locomotives, or water vessels during transport. Such transportation can often involve unexpected jostling which can dislodge the containers leading to costly and potentially environmentally damaging spills. Securing individual containers to the vehicles can be costly, time-consuming and involve special expertise.

Therefore, there is a need for an inexpensive way to secure arrays of similarly shaped containers for transport which addresses some or all of the above identified inadequacies.

SUMMARY

The principal and secondary objects of the invention are to provide improved transport of containers. These and other objects are achieved by providing a dedicated bracket for each container to releasably secure it to its neighboring containers and to the vehicle transporting the containers.

In some embodiments the shape of the bracket can be described as generally ring-shaped having a circular planar body having a diameter sized to substantially match the outer diameter of the circular end of a cylindrical barrel such as a standard 60 gallon oil drum which is about 57.2 centimeters (22.5 inches). In some embodiments the bracket can include a cylindrical sidewall which extends downwardly from the outer circular peripheral edge of the body to both stiffen and strengthen the body, and to discourage radial migration off of the barrel end.

In some embodiments six couplings extend radially outwardly from the sidewall at angularly evenly spaced apart locations. In some embodiments the axial positions of the couplings are reciprocatingly staggered so that a first set of three couplings angularly spaced apart 120 degrees are located at a first upper axial position while a second set of three couplings spaced apart 120 degrees, and angularly offset 60 degrees from the first set of coupling, are located at a second lower axial position. In some embodiments the couplings extending from adjacent brackets can overlap one another, bringing their respective loop apertures in alignment so they can be engaged by a retaining pin, while the top surface of the adjacent brackets remain substantially co-planar.

The original text of the original claims is incorporated herein by reference as describing features in some embodiments.

DESCRIPTION OF THE EXEMPLARY EMBODIMENTS

Figures 1, 2:
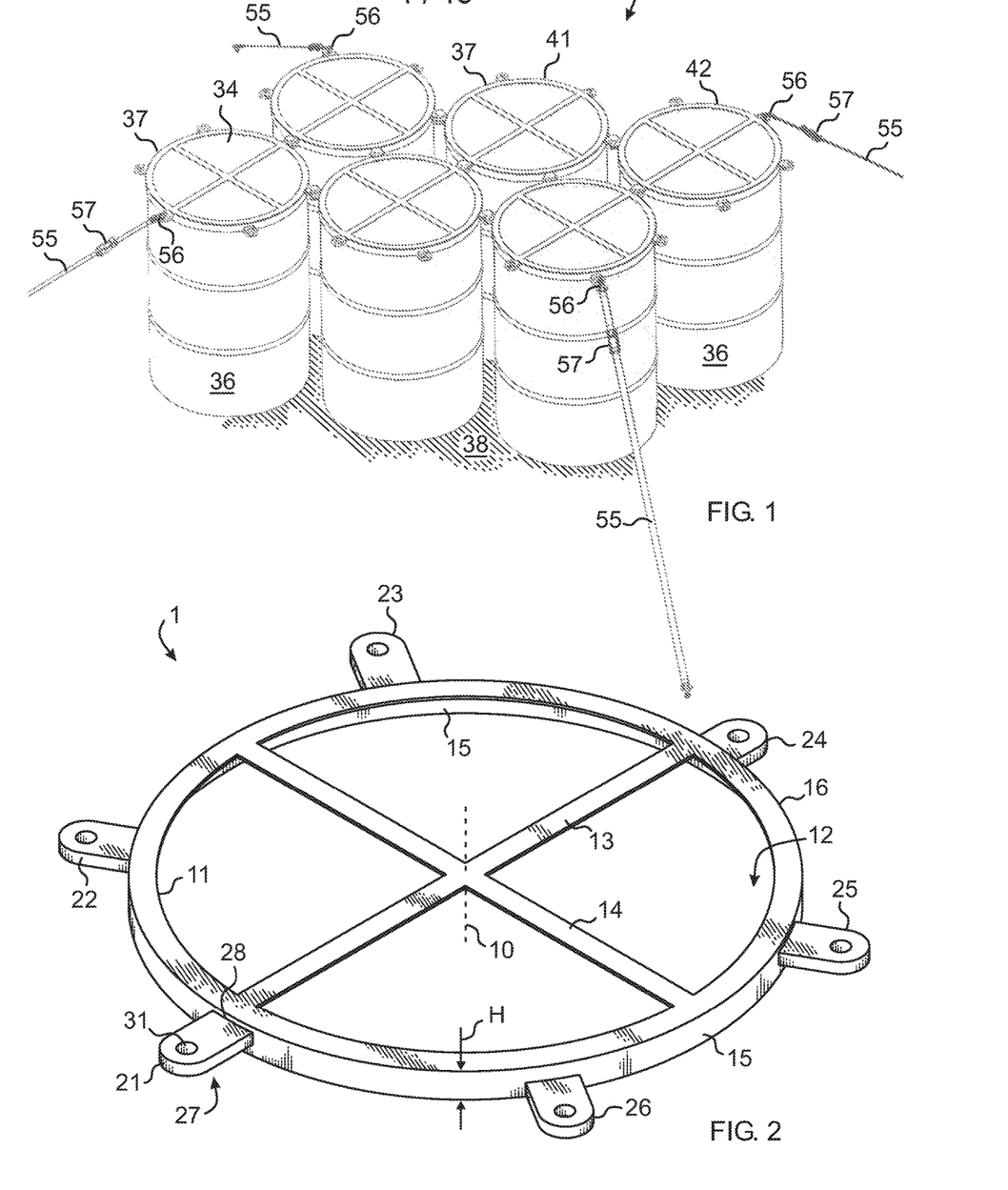
FIG. 1 is a diagrammatic perspective view of a group of conjoined barrel tie-down brackets securing the same number of barrels to the bed of a flat bed truck.
FIG. 2 is a diagrammatic perspective view of a barrel tie-down bracket according to an exemplary embodiment of the invention.

Referring now to the drawing, there is shown in FIGS. 1-2, an embodiment of a bracket 1 which includes a substantially flat, circular, ring-shaped body 11 having a central axis 10 and a pair of mutually orthogonal diametric crosspieces 13,14 spanning the center hole 12 of the body to stiffen and strengthen the body. The bracket has a cylindrical sidewall 15 having a substantially uniform height H which extends downwardly from the outer circular peripheral edge 16 of the body. The body 11 and inner diameter of the sidewall 15 can have a diameter sized to allow the bracket to intimately nest over the outer diameter of the circular end 34 of a cylindrical barrel 36 such as a standard 60 gallon oil drum which is about 57.2 centimeters (22.5 inches). A purpose of the sidewall is to both stiffen and strengthen the body, and to discourage radial migration of the bracket off of the barrel. The bracket can be from a durable, rigid, strong material such as steel or plastic.

Figure 18:
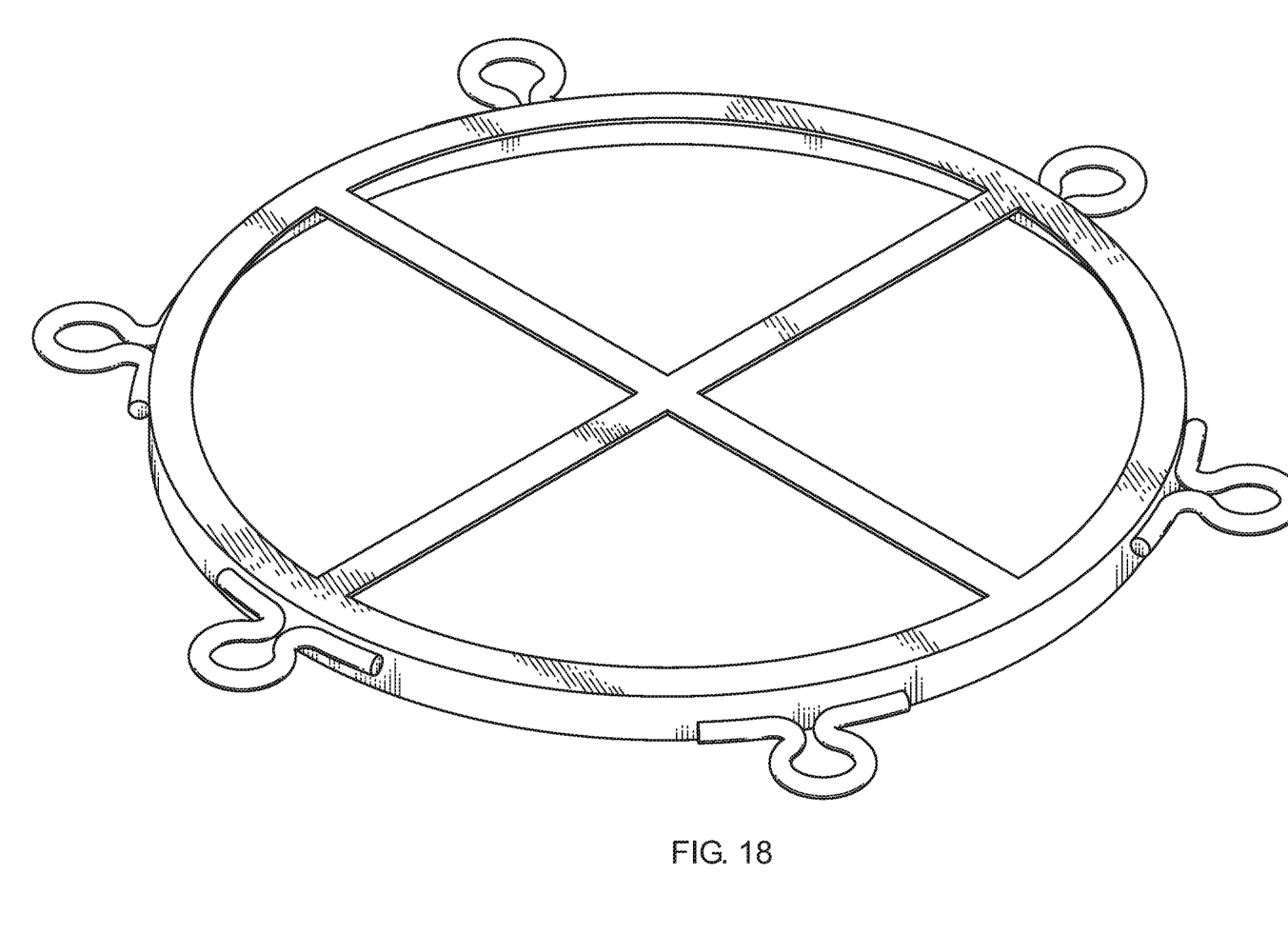
FIG. 18 is a top, front, left side perspective view of a barrel tie-down bracket according to an alternate embodiment having alternately shaped couplings.
Figure 19:
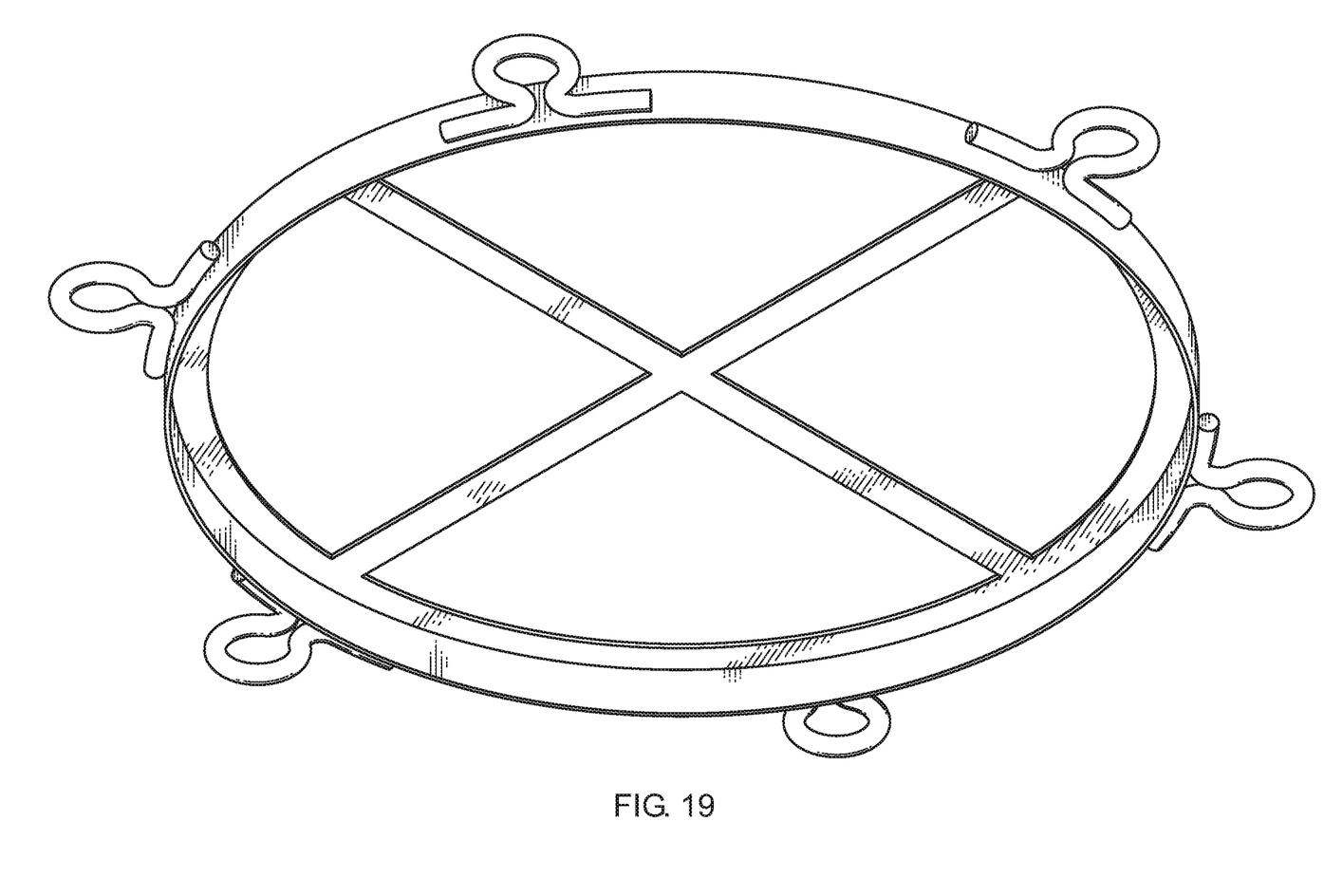
FIG. 19 is a bottom, back, right side perspective view thereof.
Figure 20:
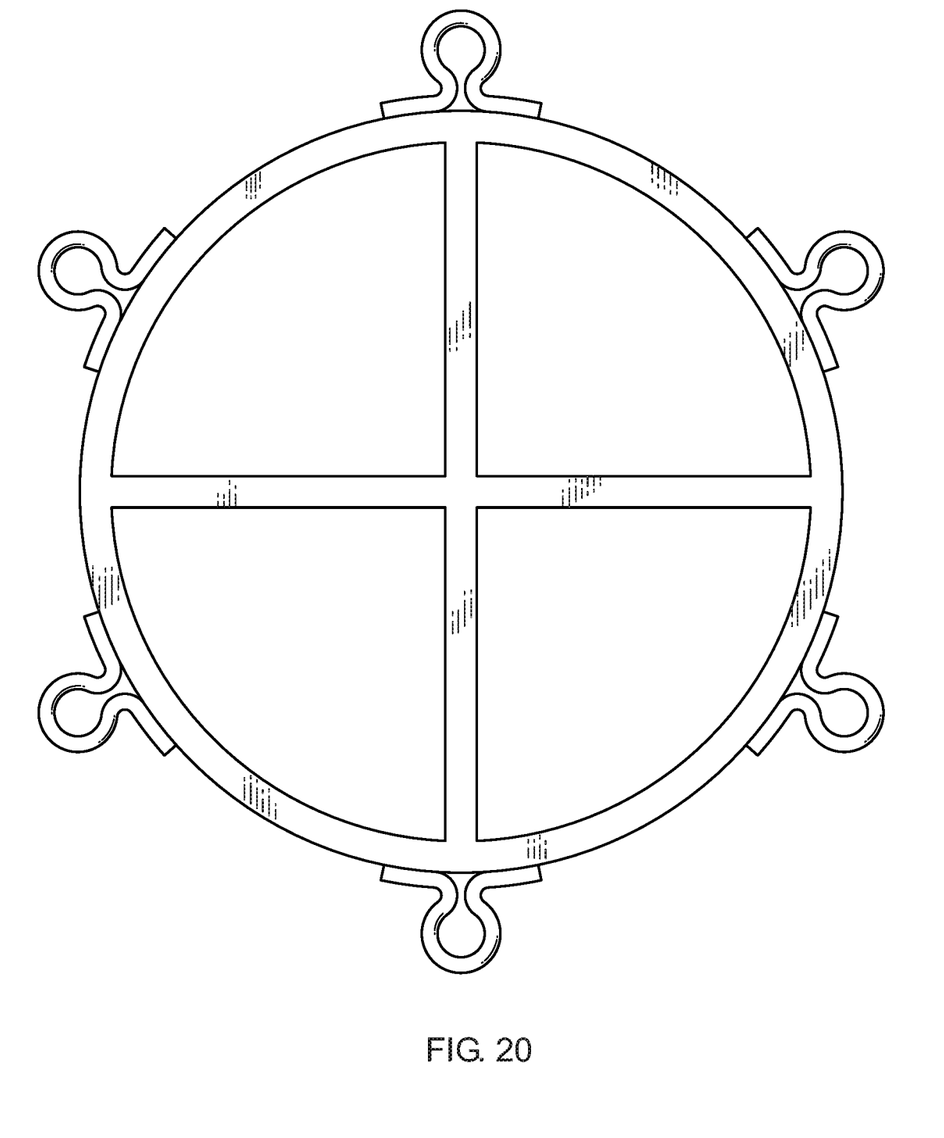
FIG. 20 is a top plan view thereof.
Figure 21:
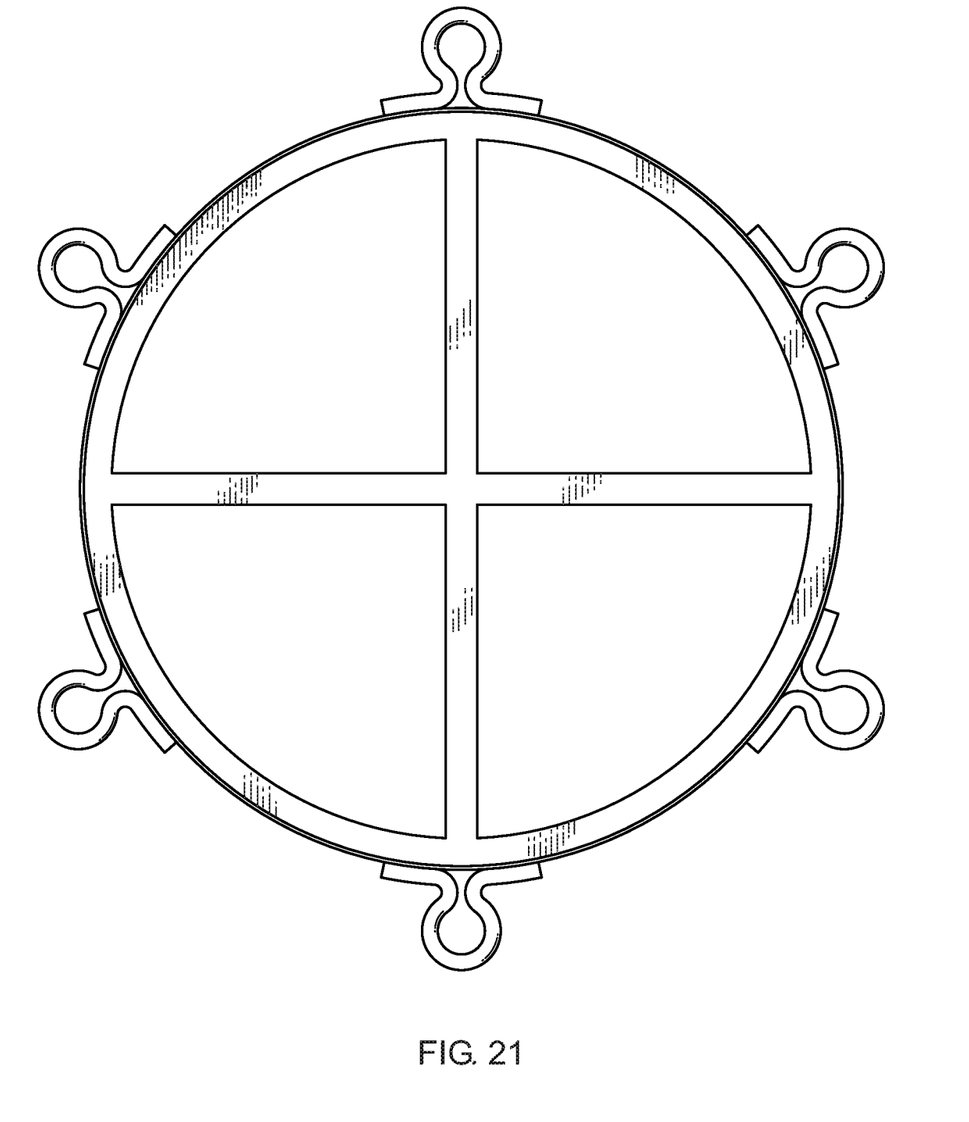
FIG. 21 is a bottom plan view thereof.
Figure 22:
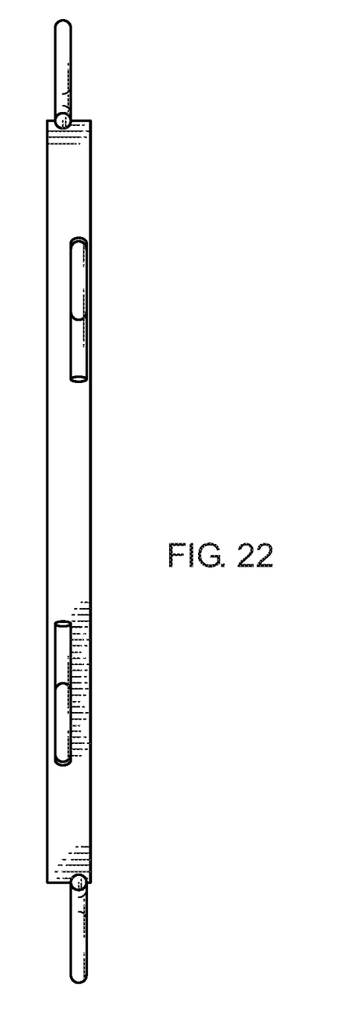
FIG. 22 is a right side plan view thereof, the left side plan view being a mirror image thereof.
Figure 23:
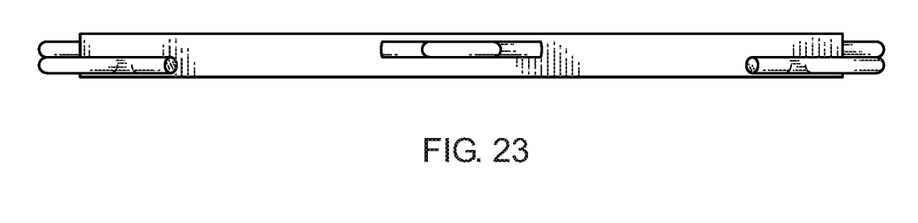
FIG. 23 is a front plan view thereof, the back plan view being a mirror image thereof.

Six couplings 21-26 extend radially outwardly from the sidewall 15 at angularly evenly spaced apart locations. Thus, the angular spacing can be about 60 degrees between adjacent couplings. Each coupling can be formed by a D-shaped tab 27 having a medial cylindrical aperture 31 and having a flattened side 28 connected to the sidewall. Alternately, as shown in FIG. 18, each coupling can be formed by a loop 29 of oblong bar material and shaped to have a substantially Greek letter omega shape where the open feet are connected to the sidewall.

The axial positions of the couplings 21-26 are reciprocatingly staggered so that a first set of three couplings 21,23,25 mutually uniformly angularly spaced apart by about 120 degrees are located at a first upper axial position while a second set of three couplings 22,24,26 mutually uniformly angularly spaced apart by about 120 degrees, and angularly offset from the first set by about 60 degrees, are located at a second lower axial position. In this way, a pair of brackets can be secured upon a pair of co-planarly adjacent barrels by engaging similar sections of their uniform geometry, namely their circular ends. The couplings extending from coplanarly adjacent brackets can overlap one another, bringing their respective apertures 31 in alignment so they can be engaged by a retaining pin, while the top surface of the adjacent brackets remain substantially coplanar.

As shown in FIG. 1, by locating the six couplings at 60 degree intervals around the outer circumference of the sidewall, an array 35 of barrels 36 each having its own dedicated bracket 37 can be loaded for transport on the supporting bed surface 38 of a vehicle in the most compact triangular or hexagonal packing manner. By tying the array together, it is far less likely that any barrel will be dislodged. However, the bracketed barrels can also be further secured upon the support surface 38 by attaching one or more tie-down cables 55 to the vehicle. Each adjustable tie-down cable includes an ratcheting adjustment device 57 and a hook 56 dimensioned to releasably engage the aperture of a free coupling.

Figure 3:
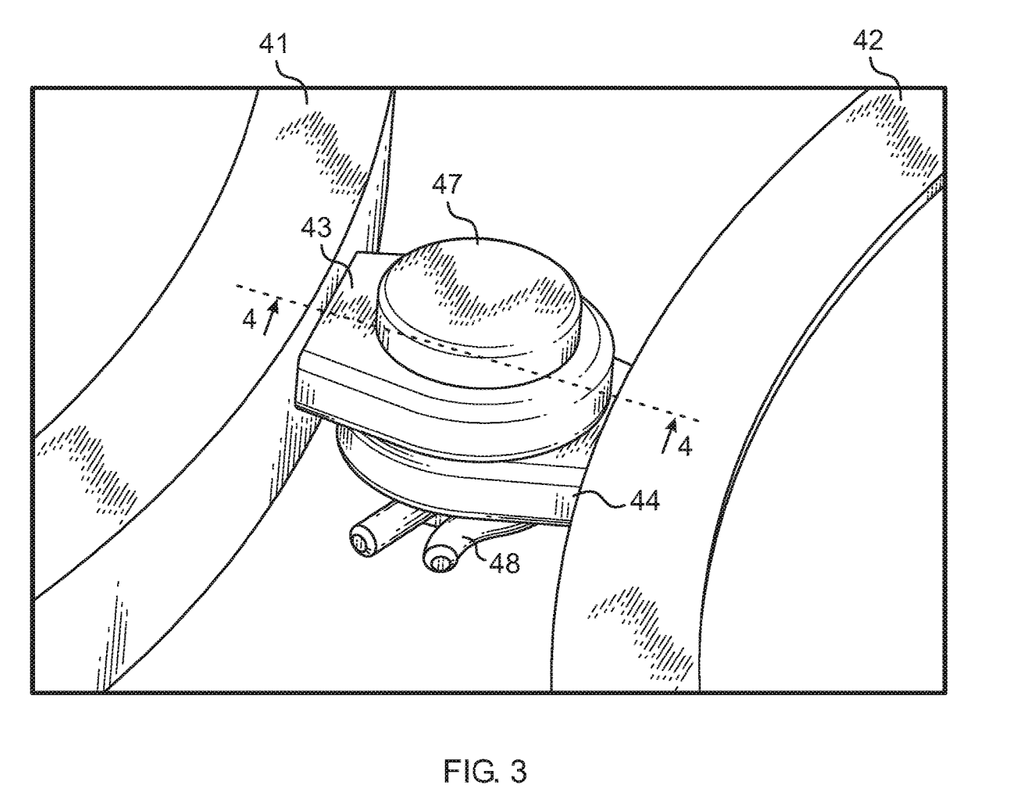
FIG. 3 is a diagrammatic partial perspective view of a pair of adjacent barrel tie-down brackets conjoined by a fastening pin engaging the holes of overlapping peripheral couplings.
Figure 4:
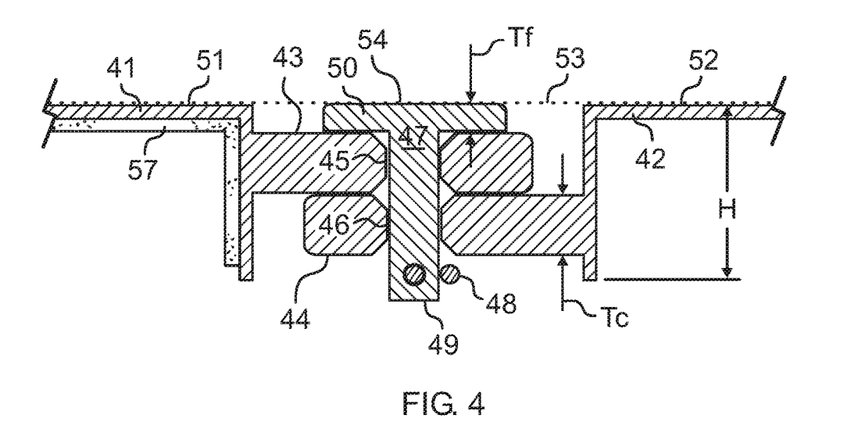
FIG. 4 is a diagrammatic partial cross-sectional side view of an interconnected pair of bracket couplings of FIG. 3 taken along line 4-4.

Referring now to FIGS. 3 and 4, a pair of co-planarly adjacent brackets 41,42 are angularly oriented to allow one of their respecting couplings 43,44 to overlap so that the couplings can be interconnected and the two brackets can be conjoined. Overlapping couplings having co-aligned apertures 45,46 can be secured to one another by a fastener such as a headed retaining pin 47 including an axial post 49 sized to intimately engage both apertures. The pin restricts radial movement between conjoined brackets. The pin can be held axially in place by a clip such as a cotter pin 48 engaging the end of the post opposite the head 50. Alternately, other fasteners, both releaseable and non-releaseable, such as threaded bolts, clamps, clips, corkscrew pins, padlocks, rivets or the like can be used. Although the preferred exemplary embodiment describes a bracket system which is intended to be reusable, the disclosed bracket system can be made from disposable or recyclable plastic, conjoined with permanent fasteners, and removed from the array of barrels or other containers while conjoined or by cutting some or all of the interconnected couplings. This view also shows that each bracket 41,42 can have a substantially L-shaped cross-sectional geometry.

The axially staggered couplings 43,44 allow the adjacent brackets 41,42 to have upper surfaces 51,52 which are coplanar, falling substantially within the same plane 53. The dimensioning of the head 50 of the pin 47 can be selected to allow the upper surface of the head to be coplanar as well. By keeping these surfaces coplanar, the chances of the brackets inadvertently snagging on something are minimized.

FIG. 4 also shows that the bracket can be adapted to carry one or more layers 57 of resilient material such as neoprene to more firmly secure the bracket to the barrel and accommodate minor variations in diameter due to dents or manufacturing inconsistencies. The resilient material layer also helps cushion barrels from vibration.

Figure 5:
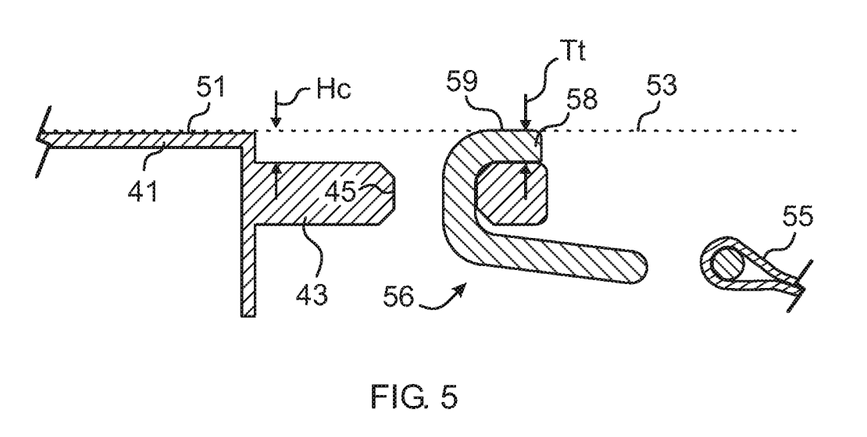
FIG. 5 is a diagrammatic partial cross-sectional side view of a bracket coupling being engaged from below by the hook of a securing cable.
Figure 6:
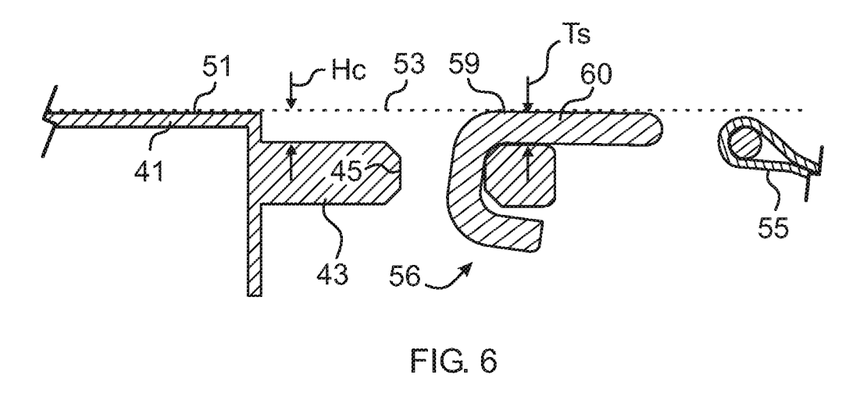
FIG. 6 is a diagrammatic partial cross-sectional side view of a bracket coupling being engaged from above by the hook of a securing cable.

Further, as shown in FIGS. 5-6 the hooks 56 of the tie-down cables 55 can be dimensioned so that no portion of the hook extends beyond the common plane 53 of the upper surfaces of joined adjacent brackets and their connecting pins regardless of whether the hook engages an axially upper or axially lower aperture of a coupling.

In FIG. 5 where the coupling 43 being engaged is one of the set of couplings in the upper axial position, the hook 56 can engage from below so that its tip portion 58 forms an upper surface 59 at or below the plane 53 formed by the upper surface 51 of the bracket 41. The hook 56 can be made to have a tip portion which has a maximum vertical dimension Tt which is less than or equal to the height He of the gap formed between the upper surface of the coupling and the upper surface of the bracket. This prevents any portion of the hook being located above the plane when engaged where it may interfere with structures above that plane.

Similarly, as shown in FIG. 6, where the coupling 43 is engaged by the hook 56 from above, the shank portion 60 can be dimensioned so that the maximum vertical dimension Ts is less than or equal to the height He of the gap between the upper surfaces of the coupling and the bracket 41. This prevents any portion of the hook being located above the common plane 53 of the adjacent bracket upper surfaces when engaged. This also allows non-interfering engagement with any of the set of axially lower couplings.

In this way the upper surface of the array presents a coplanar surface so that snags are reduced and the top of the array can support a flat platform such as a layer of plywood which in turn can support a second array stacked thereon. In this way the brackets are useful in securing many barrels in a warehouse environment.

It shall be understood that the couplings are further shaped and dimensioned to have rounded outer surfaces which help avoid their inadvertently damaging or snagging items of clothing, cables or other materials that may contact the bracket.

Figure 7:
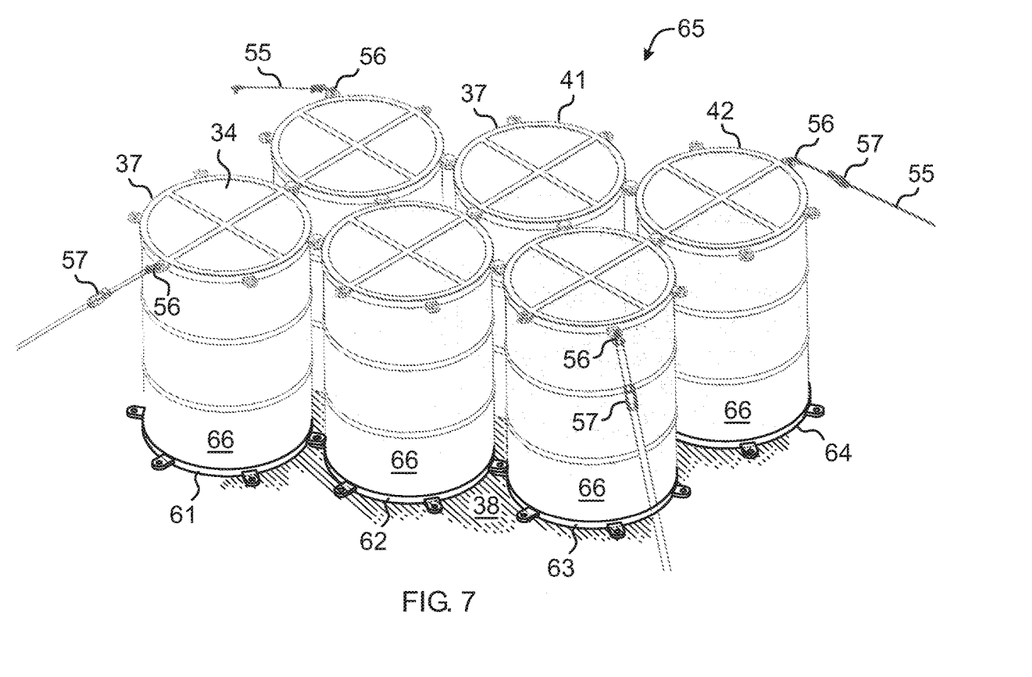
FIG. 7 is a diagrammatic perspective view of an array of co-planarly adjacent barrels arranged in a triangular packing manner on a flatbed truck engaged on their bottom ends by a second group of conjoined barrel tie-down brackets.

For an even more rugged arrangement, a second array of interconnected brackets 61,62,63,64 can be formed on the circular opposite ends of the array 65 of barrels as shown in FIG. 7.

Figure 8:
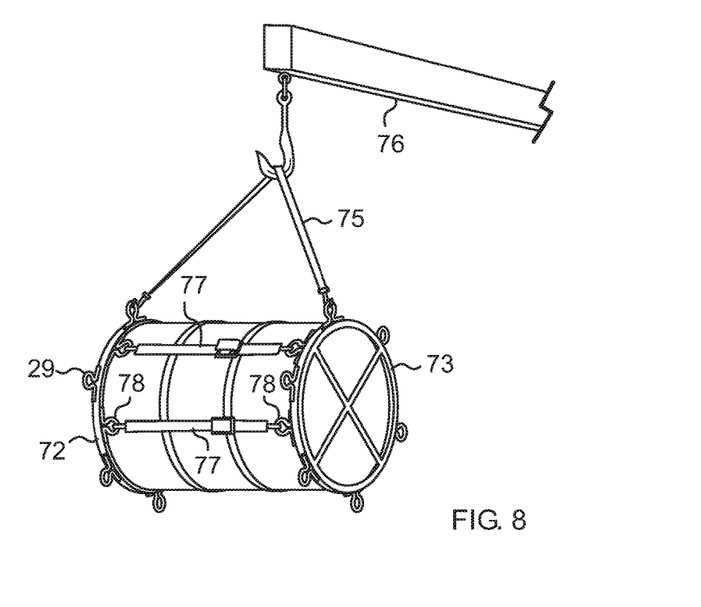
FIG. 8 is a diagrammatic perspective view of a barrel engaged by a pair of brackets at both ends being lifted by a hoist.

As shown in FIG. 8 each barrel 71 can be equipped with brackets 72,73 at both ends and thereby moved individually using the attached brackets as convenient grasping points, or by using for example a cable 75 and hoist 76. The brackets can be secured to the ends of the barrel by a plurality of axial straps 77 engaging the couplings of both brackets, or other spaced apart anchorments 78 formed onto the brackets.

Figure 9:
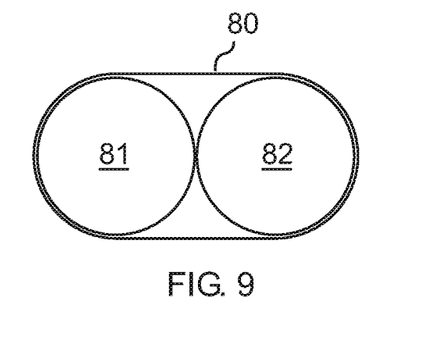
FIG. 9 is a diagrammatic top plan view of a pair of co-planarly adjacent barrels engaged by a single oval-shaped bracket.
Figure 10:
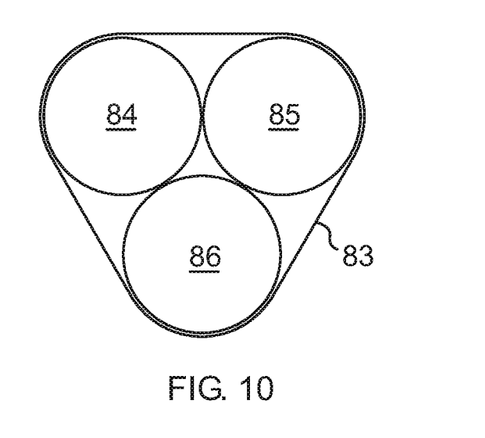
FIG. 10 is a diagrammatic top plan view of three co-planarly adjacent barrels arranged in a triangular packing manner and engaged by a single rounded equilateral triangle-shaped bracket.
Figure 11:
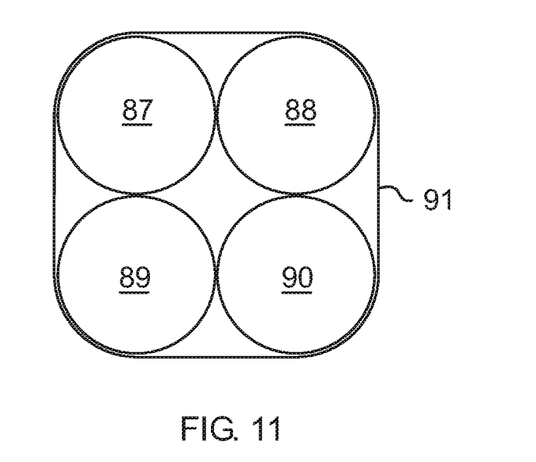
FIG. 11 is a diagrammatic top plan view of four co-planarly adjacent barrels arranged in a square-type packing manner and engaged by a single rounded-corner square-shaped bracket.
Figure 12:
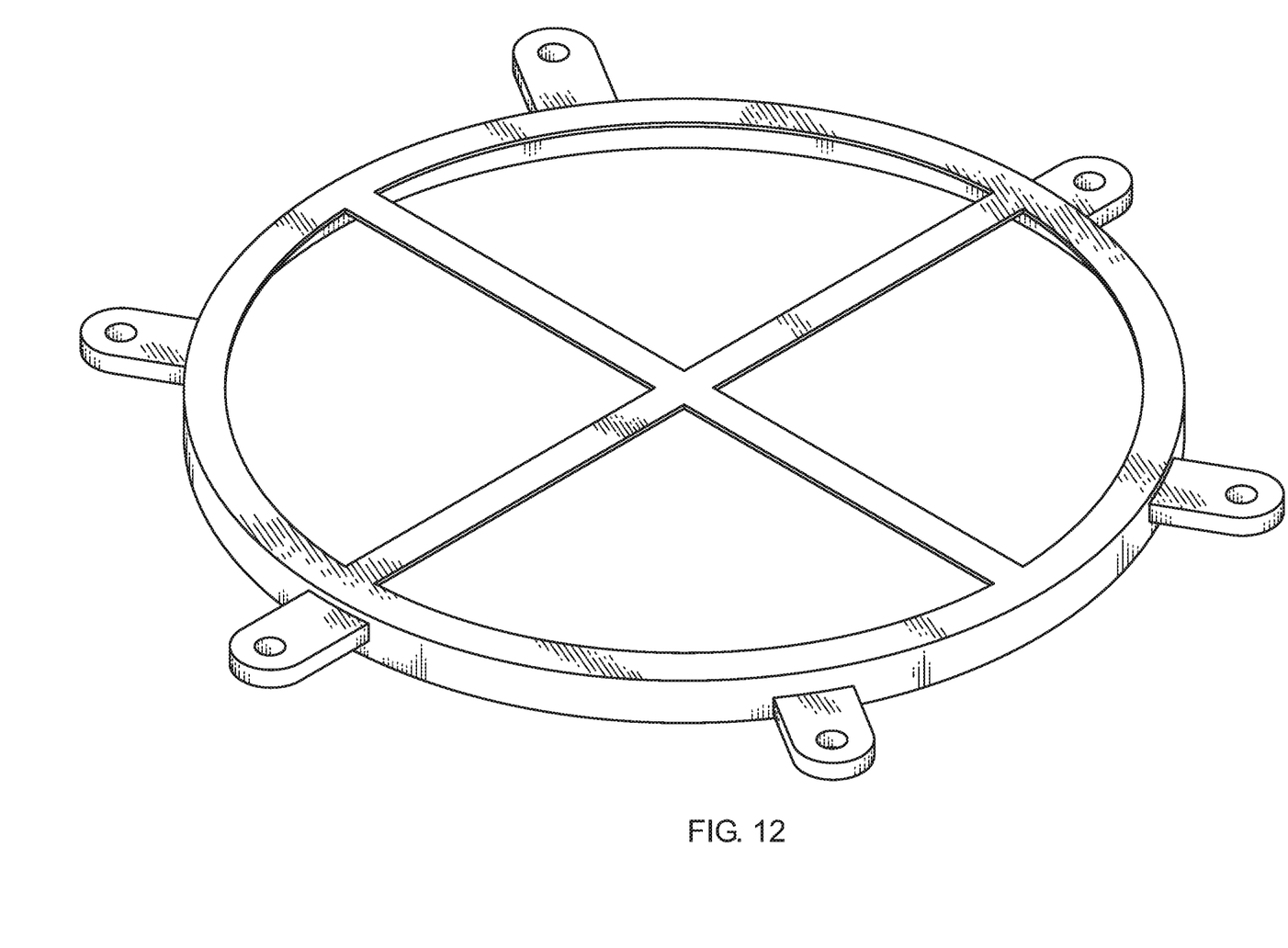
FIG. 12 is a top, front, left side perspective view of a barrel tie-down bracket of FIG. 1.
Figure 13:
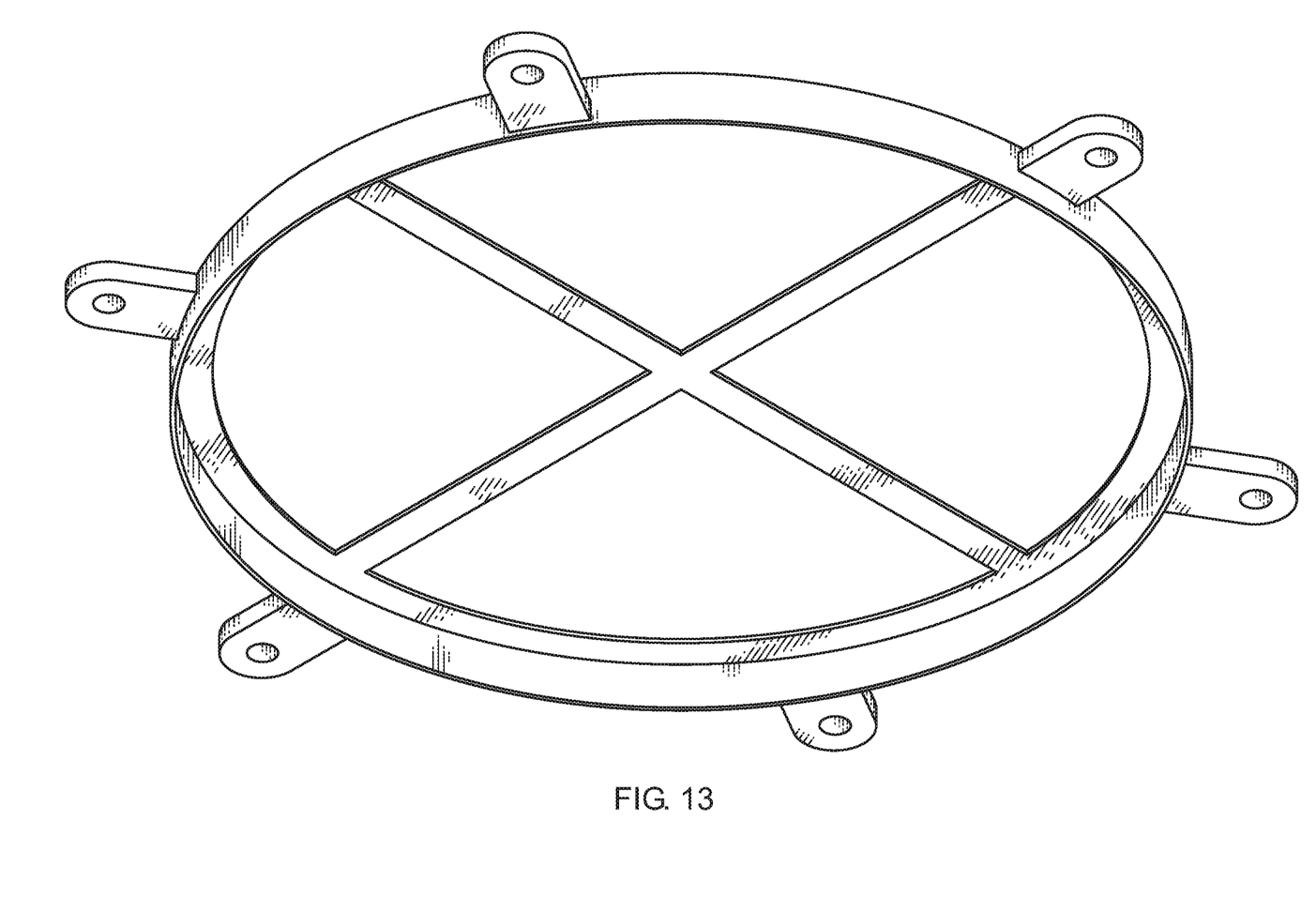
FIG. 13 is a bottom, back, right side perspective view thereof.
Figure 14:
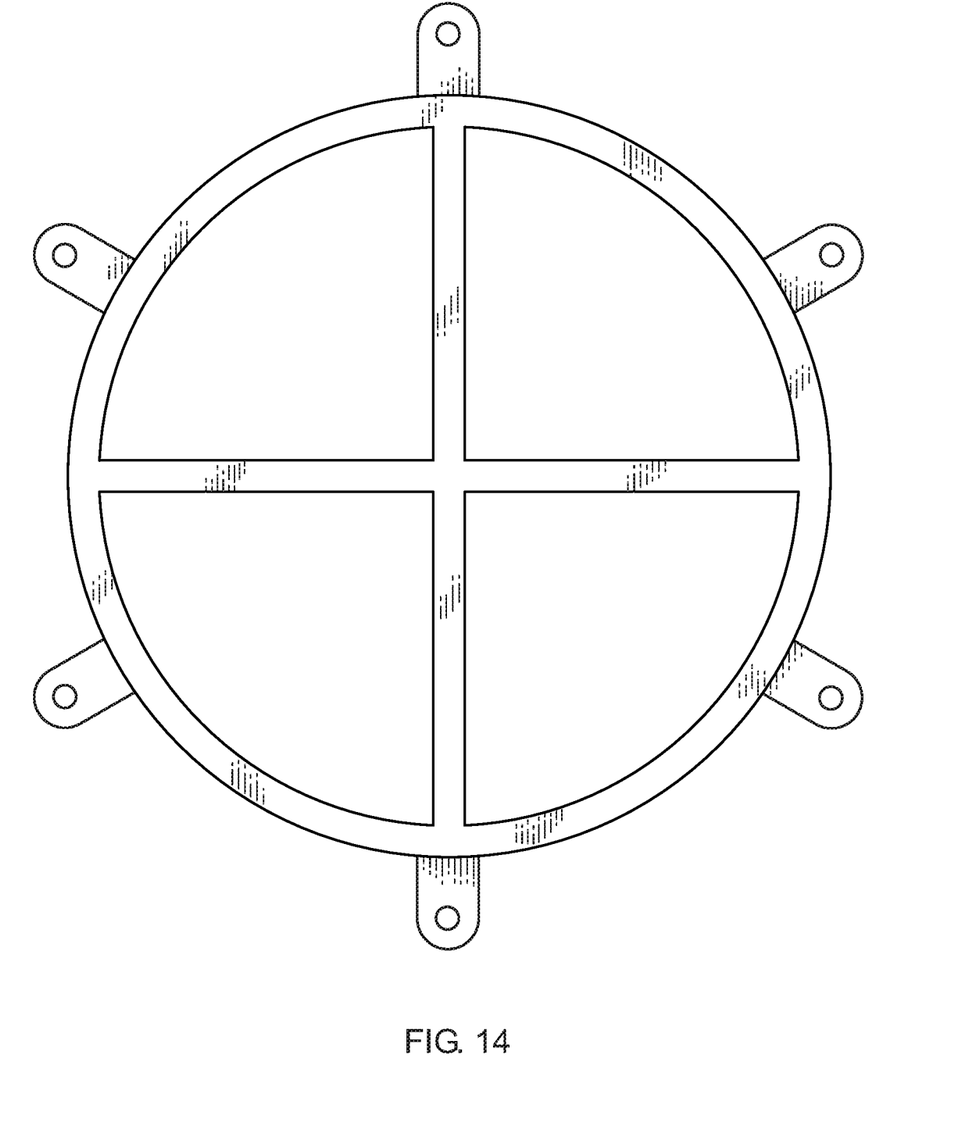
FIG. 14 is a top plan view thereof.
Figure 15:
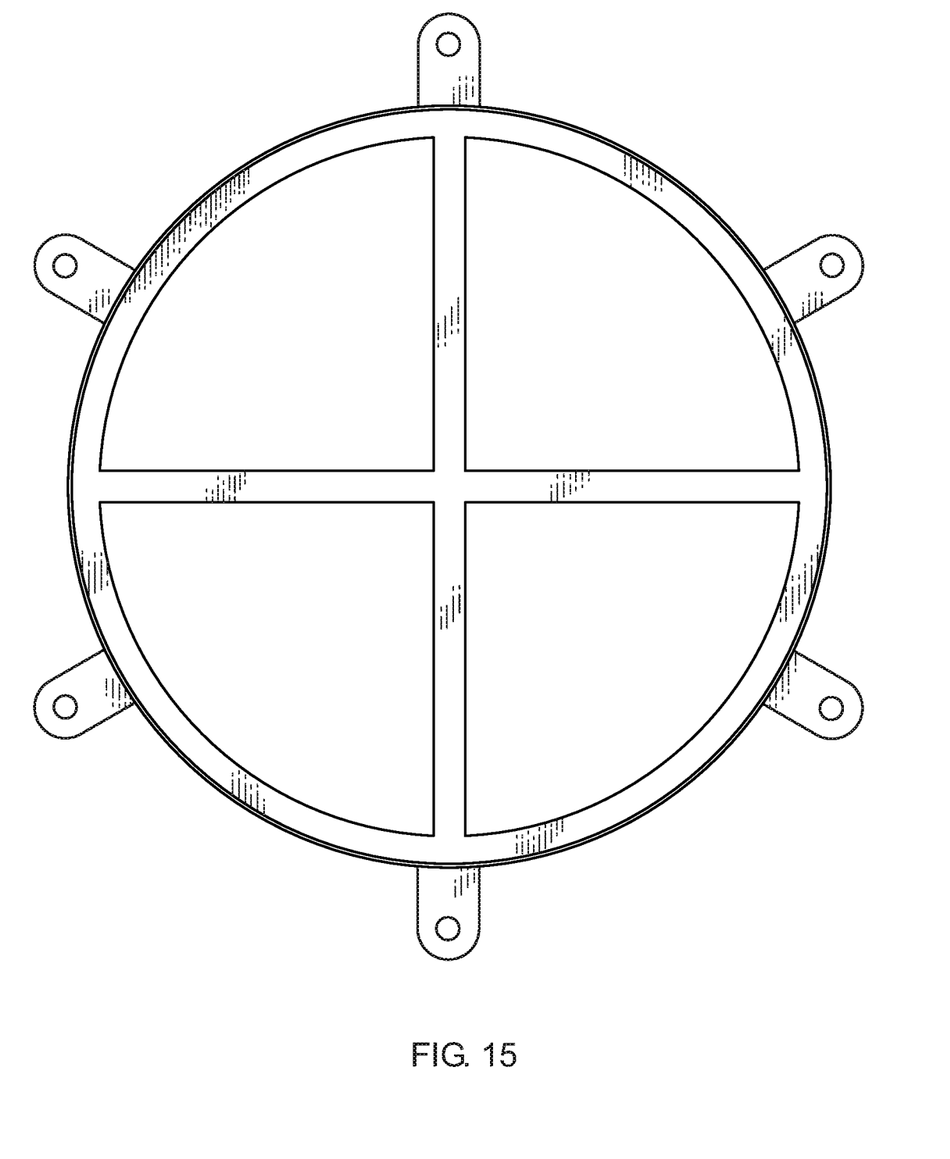
FIG. 15 is a bottom plan view thereof.
Figure 16:
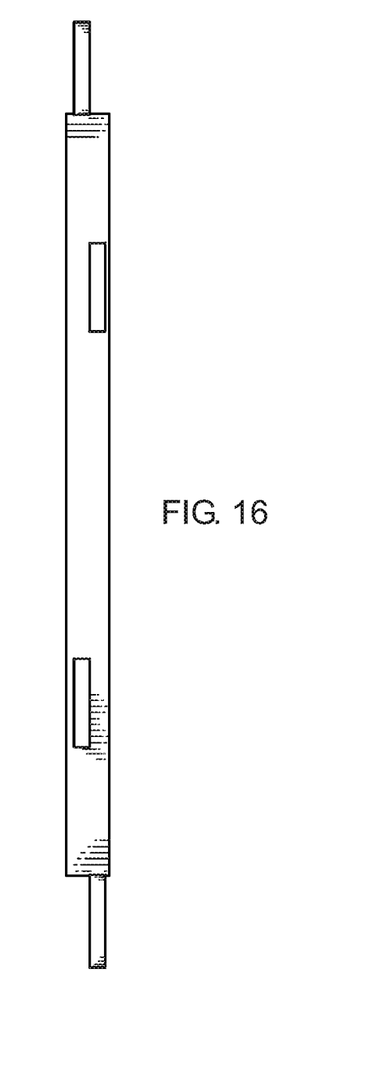
FIG. 16 is a right side plan view thereof, the left side plan view being a mirror image thereof.
Figure 17:
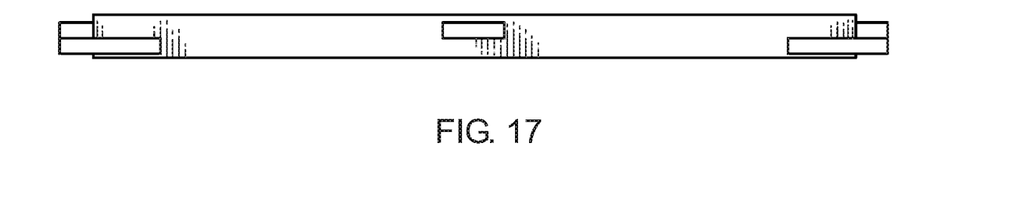
FIG. 17 is a front plan view thereof, the back plan view being a mirror image thereof.

As shown in FIGS. 9-11, the bracket can be designed to be engaged by a plural number of adjacent barrels. In FIG. 9, a bracket 80 having a generally oval shape can engage the co-planarly adjacent ends of a pair of barrels 81,82. In FIG. 10, a bracket 83 having a generally rounded equilateral triangular shape engages three co-planarly adjacent barrels 84,85,86 arranged in a triangular packing manner. In FIG. 11, four co-planarly adjacent barrels 87,88,89,90 arranged in a square-type packing formation can be engaged by a bracket 91 having a generally rounded corner square shape. Even though the arrangement of barrels in the square shape takes up more space, in many operations it is preferable so that the four barrels can be carried on easily moved familiar square wooden pallets and present the same footprint regardless of orientation.

FIGS. 12-17 show barrel tie-down bracket of FIG. 2 in various other views.

FIGS. 18-23 show the various views of an alternate embodiment of a barrel tie-down bracket having each coupling formed by a loop of oblong bar material and shaped to have a substantially Greek letter omega shape where the open feet are connected to the sidewall.

It shall be understood that the barrel tie-down bracket can be used for many types of substantially similarly shaped containers having predictable geometry ends, and which can be arranged so that those ends are co-planarly adjacent. Indeed, it shall be understood that only a section of the geometry needs to be uniform so long as that section is the one engaged by the bracket and that those sections are co-planarly adjacent so that the couplings can be co-oriented for interconnection so that the containers can be securely conjoined. For arrays of containers that are uniformly shaped, brackets can be manufactured in a more uniform manner. An advantage of the disclosed bracket system for substantially cylindrical containers such as barrels, including standard oil drums, having axially staggered couplings is that each bracket can be manufactured identically thus avoiding costly changes in molding.

Although the above utilitarian aspects have been described in connection with the operation of an array of oil drums, it shall be understood that the above system can be adapted to many other containers having similar geometries to one another.

While the preferred embodiments of the invention have been described, modifications can be made and other embodiments may be devised without departing from the spirit of the invention and the scope of the appended claims.

What is claimed is:

1. A device for securing a pair of containers having a uniform geometry to one another, said device comprises:
   first and second brackets;
   wherein each of said brackets comprises:
      a body portion shaped and dimensioned to intimately and releasably nest over a section of said uniform geometry;
      six couplings located at spaced apart locations on the periphery of said bracket;
   wherein one of a first set of said couplings on said first bracket is shaped and dimensioned to interconnect with a co-oriented one of a second set of said couplings on said second bracket.

2. The device of claim 1, wherein said section of said uniform geometry is co-planar when said pair of containers is arranged in a co-planarly adjacent manner.

3. The device of claim 2, wherein said section of said uniform geometry is a circular top end of said container.

4. The device of claim 1, wherein said body portion has a substantially L-shaped cross-sectional geometry.

5. The device of claim 1, wherein said one of a first set of said couplings on said first bracket is an upper coupling axially spaced apart from said one of a second set of said couplings on said second bracket wherein said one of a second set of said couplings is a lower coupling.

6. The device of claim 5, wherein said upper coupling is axially located to overlap said lower coupling when said first and second brackets are coplanarly adjacent.

7. The device of claim 5, wherein said upper coupling is shaped to have an axial upper aperture, and said lower coupling is shaped to have an axial lower aperture; and wherein said upper aperture and said lower aperture can be engaged by a fastener restricting radial movement between said first and second brackets when said first and second brackets are coplanarly adjacent.

8. The device of claim 7, wherein said fastener is selected from the group consisting of: threaded bolts, clamps, clips, corkscrew pins, padlocks and rivets.

9. The device of claim 1, wherein a first uppermost surface of said first bracket is coplanar with a second uppermost surface of said second bracket.

10. A device for securing an array of containers to one another, each of said containers having a uniform geometry, said device comprises:
   first and second brackets;
   wherein each of said brackets comprises:
      a body portion shaped and dimensioned to intimately and releasably nest over a section of said uniform geometry of a finite number of said containers arranged in a co-planarly adjacent arrangement;
      six couplings located at spaced apart locations on the periphery of said bracket;
   wherein one of a first set of said couplings on said first bracket is shaped and dimensioned to interconnect with a co-oriented one of a second set of said couplings on said second bracket.

* * * * *